(12) United States Patent
Doutt

(10) Patent No.: US 7,311,118 B2
(45) Date of Patent: Dec. 25, 2007

(54) FLOATING BALL CHECK VALVE

(75) Inventor: Michael L. Doutt, Madison, AL (US)

(73) Assignee: Parker-Hannifin Corporation, Cleveland, OH (US)

( * ) Notice: Subject to any disclaimer, the term of this patent is extended or adjusted under 35 U.S.C. 154(b) by 518 days.

(21) Appl. No.: 11/047,183

(22) Filed: Jan. 31, 2005

(65) Prior Publication Data

US 2005/0217730 A1    Oct. 6, 2005

Related U.S. Application Data

(60) Provisional application No. 60/557,652, filed on Mar. 30, 2004.

(51) Int. Cl.
  *F16K 15/04* (2006.01)
(52) U.S. Cl. .............. 137/539.5; 137/15.18; 137/315.33; 251/364
(58) Field of Classification Search ........... 137/15.18, 137/315.33, 516.27, 516.29, 533.11, 533.13, 137/533.15, 539, 539.5; 251/364
See application file for complete search history.

(56) References Cited

U.S. PATENT DOCUMENTS

| | | | |
|---|---|---|---|
| 2,481,713 A * | 9/1949 | Bertea ................... 137/539.5 |
| 2,931,385 A * | 4/1960 | Carlisle et al. ......... 137/516.29 |
| 3,040,771 A | 6/1962 | Droitcourt et al. |
| 3,255,774 A * | 6/1966 | Gallagher et al. ..... 137/516.29 |
| 4,084,304 A | 4/1978 | Myers |
| 4,197,875 A | 4/1980 | Schieferstein et al. |
| 4,506,690 A * | 3/1985 | Mitchell ................ 251/364 |
| 4,541,412 A | 9/1985 | Bagshaw et al. |
| 4,613,738 A | 9/1986 | Saville |
| 4,736,083 A | 4/1988 | Saville |
| 5,107,890 A | 4/1992 | Gute |
| 5,251,664 A | 10/1993 | Arvidsson et al. |
| 5,749,394 A | 5/1998 | Boehmer et al. |
| 6,250,336 B1 | 6/2001 | Murphey et al. |

OTHER PUBLICATIONS

U.S. Appl. No. 60/557,652, Michael L. Doutt, Floating Ball Check Valve, filed Mar. 30, 2004.

* cited by examiner

*Primary Examiner*—John Rivell
(74) *Attorney, Agent, or Firm*—Christopher H. Hunter

(57) ABSTRACT

In an improved floating ball check valve including a body having an outlet port, a cap, having an inlet port, joined with the body, a ball guide slidably received within the body and having a ball pocket for receiving a sealing ball, a biasing spring for biasing the ball toward the inlet port, an annular seat retainer in the cap and a generally ring-shaped seat, of non-resilient plastic material of preferably thermoplastic or fluoroplastic composition, substantially received within a conical bore within the cap and retained therein via the seat retainer, with the spherical surface of the ball being urged into a sealing engagement with an arcuate/spheric sealing surface of the seat having a radius slightly larger than the radius of the sealing ball, with the noted seat materials and geometries permitting seat self-compensation for pressure and temperature. An improved manufacturing method is also set forth.

22 Claims, 12 Drawing Sheets

FLOATING BALL CHECK VALVE

CROSS-REFERENCE TO RELATED CASES

The present application claims the benefit of the filing date of U.S. Provisional Application Ser. No. 60/557,652, filed Mar. 30, 2004, the full disclosure of which is incorporated herein by reference.

FIELD OF THE INVENTION

The present invention generally relates to check valves, particularly to floating ball check valves with replaceable thermoplastic valve seats having specific curved seat surfaces that mate with spherical radii of associated sealing balls, thus permitting self-compensation for pressure and temperature.

BACKGROUND OF THE INVENTION

Check valves are routinely used to permit fluid flow in but one direction, with two common types thereof being the ball check valve and the poppet valve. Both types may include a spring to bias the sealing member, either the ball or the poppet, against the valve seat to maintain a seal until the upstream fluid pressure, acting against the sealing member, exceeds the spring force to unseat the sealing member to allow fluid flow above a predetermined fluid or crack pressure.

Elastomeric material seats are commonly used in both of the noted types of check valves, as this material provides for an excellent and reliable seal at both low and high fluid pressures. Since elastomeric materials are resilient, the nature of elastomeric seals is dynamic, which only requires a minimum force to bias the ball or poppet against the valve seat to produce a seal at either low or high fluid operating pressures. Many check valve designs limit the bias force of the ball or poppet against the seat since excessive force can damage the elastomeric material and cause the valves to leak. However, elastomeric seals are limited in application, typically by either degradation, caused by chemical attack, or extreme low or high operating temperatures.

Thermoplastic materials are often used as replacements for elastomeric materials when these noted conditions apply. However, thermoplastic materials, unlike elastomeric materials, are not resilient and therefore are not well suited to provide for reliable dynamic seals. Thermoplastic materials provide the most effective seals under static loading conditions, requiring compressive forces that must increase with increasing fluid pressures to maintain their seals. However, thermoplastic materials also have high coefficients of thermal expansion and low compressive yield strengths that decrease rapidly with increasing operating temperatures. They also deform permanently, over time, at stress levels well below their yield strengths, and deform in greatly increasing amounts at higher operating temperatures, all of which can create difficulties when thermoplastic materials are used for seat materials in check valves.

In the existing art, some check valve designs offer thermoplastic seats as an option for elastomeric material seats, with either identical or closely similar valve seat geometries. However, check valves designed for resilient dynamic seals will not perform well with non-resilient seat materials. This is reflected in published limitations on seal tightness as well as temperature and pressure limits which fall well below the full capabilities of thermoplastic materials.

Other types of valve designs that commonly use thermoplastic materials for valve seats, such as quarter turn ball valves, offer seal tightness performance at pressure and temperature operating ranges that typically exceed those for existing check valves. It is therefore desirable and possible to improve upon the design of existing art ball check valves with thermoplastic seat materials such that a ball check valve will provide an equal or superior level of seal performance to that of a quarter turn ball valve.

The design and construction of the present invention is focused on easily replaceable, generally soft and somewhat flexible non-resilient plastic material, such, as for example, fluoroplastic material, valve seats. Such seats are machined or molded to final shape and separate coining is not required. These seats do have arcuate/spheric seating surfaces, but the seat radii thereof are slightly larger, by design, than the radii of the mating balls, thus permitting self-compensation for pressure and temperature. In addition, the amount of seat seal area can be designed specifically for a particular seat material, based on its mechanical properties and desired temperature and pressure operating conditions, all of which will be explained in more detail hereinafter.

The patent literature includes a large number of ball check valve constructions, with FIG. 4 of U.S. Pat. No. 5,107,890, to Gute, which pertains to a ball check valve, showing a curved seating surface matched to the ball. However, it is stated therein that the coined arcuate (curved) seating surface is complimentary to the ball surface to reduce leakage and the claimed method of manufacturing the seat requires a coining operation to "form a desired arcuate configuration seating surface". In addition, the seat is generally manufactured from a brass material and that the seat is press-fit or friction fit into the valve body. As previously noted, the seat of the present invention is formed of a non-resilient plastic material and has an arcuate/spherical seating surface having a radius slightly larger than the radius of the ball, thus permitting self-compensation for pressure and temperature.

U.S. Pat. No. 4,197,875, to Schieferstein et al., and U.S. Pat. No. 5,749,394, to Boehmer et al., both pertaining to check valves, set forth that the seats are constructed of elastomeric sealing material, not the thermoplastic seat material of the present invention, and these constructions also use a conical seat which is a of a completely different geometry than the spherical design and construction of the seat of the present invention. Further prior art patents, relating to ball check valves additionally include: U.S. Pat. No. 3,040,771 to Droitcour et al.; U.S. Pat. No. 4,084,304 to Myers; U.S. Pat. No. 4,541,412 to Bagshaw et al.; U.S. Pat. No. 4,613,738 to Saville; U.S. Pat. No. 4,736,083 to Saville; U.S. Pat. No. 5,251,664 to Arvidsson et al.; and U.S. Pat. No. 6,250,336 B1 to Murphy et al. However, none of these prior art structures disclose a spherical ball valve received within a spherical seat seal, where the seat seal is preferably formed of a fluoroplastic-type material and has a radius slightly larger than the radius of the mating ball.

SUMMARY OF THE INVENTION

Accordingly, in order to overcome the deficiencies of the prior art devices, the present invention provides an improved floating ball check valve that utilizes a generally ring-shaped seat of a non-resilient plastic material, such as a thermoplastic or fluoroplastic material, for example that can be molded or machined without requiring coining thereof. These seats have an arcuate/spheric seating surface that mates with the spherical surface of the sealing ball with the seat radius being slightly larger than the radius of the ball thus permitting self-compensation of the seat for operating pressure and temperature. In addition, the area of the seat seal can be tailored to the use of a specific material's mechanical properties.

At low fluid back pressure, the seal area is small thus generating high surface contact pressure that improves the low pressure seal. As back pressure increases, the ball is forced further into the seat, thus causing the seal to flex which increases the seal surface area in contact with the ball and helps to maintain stress in the seat at an acceptable level to prevent permanent deformation or damage to the plastic seat.

However, the seat can also compensate for high back pressures that result in seat stress into the plastic deformation range thereof. In this case, as the ball pushes deeper into the seat, the seal contact area continues to increase until the stress is redistributed and reduced to levels below the material's plastic deformation limit. The result is a permanent deformation of the seat which provides for an increase in sealing area that can, in turn, provide higher pressure loading.

While PTFE-type thermoplastics have high coefficients of thermal expansion, rapidly lose strength and are prone to extrusion (commonly called hot-flow) at higher temperatures, the seat of the present invention is designed to compensate for these material characteristics in two ways. The first way is substantially similar to the high pressure compensation mechanism already described previously, namely that the ball is forced into the seat, thereby increasing the seal area supporting the ball load until the stress is stabilized below the creep range at the particular operating temperature.

If the temperature becomes high enough, then the plastic material will expand and extrude a substantial amount. The present invention takes advantage of this phenomenon by directing material flow into an area in front of the ball and through the aperture in the seat retaining washer. This adds material to the seat area which reduces stress in the seat. The increase in seal area continues until seat stress is reduced below the material's creep limit. During testing, increases in the seal area of over 100%, at maximum operating temperature and back pressure, have been observed. The benefit of this seal enlargement is that it permits higher pressure and temperature operation while still maintaining acceptable seat stress levels.

Specifically, the structure and function, of this invention, in a floating ball check valve, comprise in combination: a. a body having inner and outer axially adjacent portions, with each non-adjacent end thereof including a coupling member, the body including a through bore, with the body inner portion having first and second concentric cylindrical bores and an outlet port; b. a cap having inner and outer axially adjacent cap portions, with each non-adjacent end thereof including a coupling member, the cap including a through bore, with the cap inner portion having a plurality of concentric cylindrical bores, the cap outer portion having an inlet port and a concentric conical surface, the body inner portion being adapted to be inserted into a first one of the plurality of cylindrical bores of the cap inner portion and coupled with the cap inner portion; c. a generally cylindrical ball guide having a through bore and axially spaced internal bore portions, the ball guide being adapted to be slidably inserted into the first bore of the body inner portion, the ball guide also including a ball pocket portion for receiving and axially centering a sealing ball; d. a biasing spring adapted to be inserted into the body through bore and confined between the body inner portion second bore and an opposing internal bore portion of the ball guide, the spring serving to bias the sealing ball in the direction of the inlet port; e. a generally annular seat retainer located adjacent to the conical bore of the cap outer portion, with a radial outer annular portion of the seat retainer being biased against a radial outer shoulder portion of the conical bore portion by an end surface of the body inner portion; and f. a generally ring shaped seat, of non-resilient plastic material, substantially received within the conical surface of the cap outer portion and retained therein via a radial inner annular portion of the seat retainer, with the spherical surface of the sealing ball being urged into a sharp corner line contact sealing engagement with an adjoining seal surface of the seat, wherein the adjoining seal surface takes the form of a curved seal surface having sufficient seal surface contact with the sealing ball to prevent excessive yielding of the non-resilient plastic seat material at predetermined operating temperatures and back pressures.

In one version thereof the curved seal surface takes the form of a spherical surface, wherein the spherical seal surface has a radius slightly larger than the spherical radius of the sealing ball, with the spherical seat surface radius being slightly larger, in the range of about 0.002 to 0.010 inches, than the spherical radius of the sealing ball.

In another version, the spherical radius of the sealing ball is slightly smaller than the radius of the spherical seal surface, with the spherical radius of the sealing ball being slightly smaller, in the range of about 0.002 to 0.010 inches, than the radius of the spherical seal surface.

In a further version, wherein the ring-shaped seat further includes a concentric through bore and a flat annular end surface, the seal spherical surface is bounded, on one end, by a radial inner end of the annular end face and, on another end, by one end of the concentric through bore, with a first intersection of the sealing ball spherical surface with the seal spherical surface being bounded by the radial inner end of the seat annular end face and a second such intersection of the sealing ball spherical surface with the one end of the seal spherical surface being bounded by the one end of the seat concentric through bore. The first intersection of the sealing ball spherical surface with the annular end face radial inner end, when viewed in cross section, is defined by a first angle bounded by two line segments extending from the center of the sealing ball to the first intersection, while the second intersection of the sealing ball spherical surface with the one end of the seat concentric through bore, when viewed in cross section, is defined by a second angle bounded by two additional line segments extending from the center of the sealing ball to the second intersection. In addition, the first angle is of a greater angular extent than the second angle, with the angular extent of the first angle ranging from about 110 to about 160 degrees and the angular extent of the second angle ranging from about 80 to about 130 degrees.

In an additional version, the non-resilient plastic material of the seat is a fluoroplastic type of material or one of a thermoplastic and fluoroplastic material and preferably selected from the group consisting of PTFE of filled, unfilled and advanced copolymer grades thereof.

In yet a differing version, the non-resilient plastic materials are selected from the group consisting of acetal, ultra high molecular weight polyethylene, filled and unfilled polymide as well as filled and unfilled polyetheretherketone materials.

Furthermore, in a method of manufacturing a ball check valve, comprising: a. providing a body having inner and outer axially adjacent portions, with each non-adjacent end thereof including a coupling member, the body including a through bore, with the body inner portion having first and second concentric cylindrical bores and an outlet port; a cap having inner and outer axially adjacent cap portions, with each non-adjacent end thereof including a coupling member, the cap including a through bore, with the cap inner portion having a plurality of concentric cylindrical bores, the cap outer portion having an inlet port and concentric conical surface; a generally cylindrical ball guide having a through bore and axially spaced internal bore portions, the ball guide also including a ball pocket portion for receiving and axially centering a sealing ball; b. inserting the body inner portion into a first one of the plurality of cylindrical bores of the cap inner portion and coupling same together; c. slidably inserting the ball guide into the first bore of the body inner portion member inner portion; d. inserting a biasing spring into the body through bore and confining same between the body inner portion second bore and an opposing internal bore portion of the ball guide, the spring serving to bias the sealing ball in the direction of the inlet port; e. locating a generally annular seat retainer adjacent the conical surface of the cap outer potion and biasing, via an end surface of the body inner portion, a radial outer annular portion of the seat retainer against a radial outer shoulder portion of the conical bore portion; and f. locating a generally ring-shaped seat, of non-resilient plastic material, substantially within the conical surface of the cap outer portion and retaining same therein via a radial inner annular portion of the seat retainer and urging the spherical surface of the sealing ball into a sharp corner line contact sealing engagement with an adjoining conical seal surface of the seal, the improvement comprising: g. modifying the adjoining conical seal surface to the form of a curved seal surface having sufficient seal surface contact with the sealing ball to prevent excessive yielding of the non-resilient plastic material at predetermined operating temperatures and back pressures.

The improved method of manufacturing further includes modifying the adjoining conical seal surface to the form of a spherical seat surface.

Another version further of the improved method includes additionally modifying the adjoining conical seal surface to have a radius slightly larger than the spherical radius of the sealing ball, by increasing the spherical seal surface radius to be slightly larger, in the range of about 0.002 to about 0.010 inches, than the spherical radius of the sealing ball.

In a differing version, the improved method further includes: selecting the non-resilient plastic material from the group consisting of thermoplastic and fluoroplastic materials.

The previously-described advantages and features, as well as other advantages and features, will, become readily apparent from the detailed description of the preferred embodiments that follow.

DETAILED DESCRIPTION OF THE INVENTION

Figure 1:
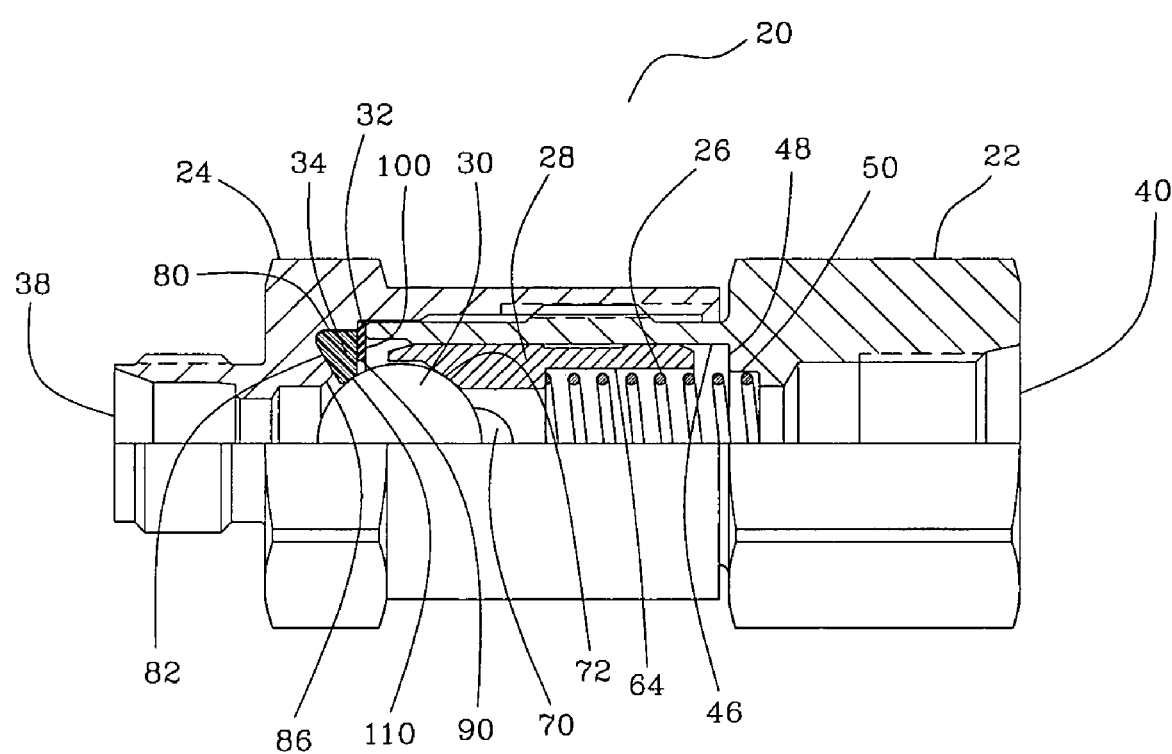
FIG. 1 is a side view, partially in section, of the floating ball check valve in accordance with this invention, illustrated in a closed position.
Figure 2:
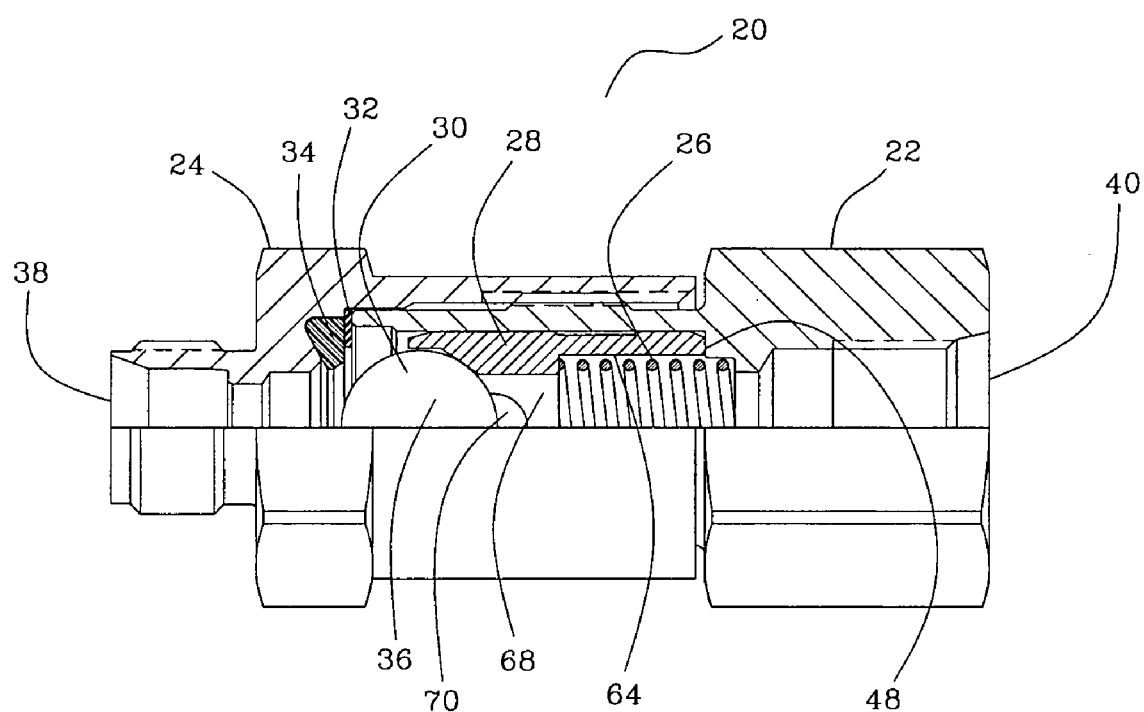
FIG. 2 is a view, similar to that of FIG. 1, illustrating the check valve in an open position.

Referring now to the several drawings, illustrated in FIG. 1 is a partial longitudinal cross section of the floating ball check valve, generally indicated at 20, showing check valve 20 in the closed position, i.e., showing the locations of the axially movable components when the biasing force exceeds the upstream pressure, thereby preventing pressurized fluid flow through check valve 20. FIG. 2 is a view, similar to that of FIG. 1, but showing check valve 20 in the open position, i.e., when the upstream fluid pressure exceeds the biasing force, thereby allowing pressurized fluid to flow through check valve 20. As best illustrated in FIGS. 1 and 2, ball check valve 20 includes a valve body 22, a valve cap 24, a bias spring 26, a ball guide 28, a sealing ball 30, a seat retainer 32 and a seat 34. In addition, check valve 20 is provided with an inlet port 38 and an outlet port 40, with the flow through check valve 20 being unidirectional from inlet port 38 to outlet port 40.

Figure 7:
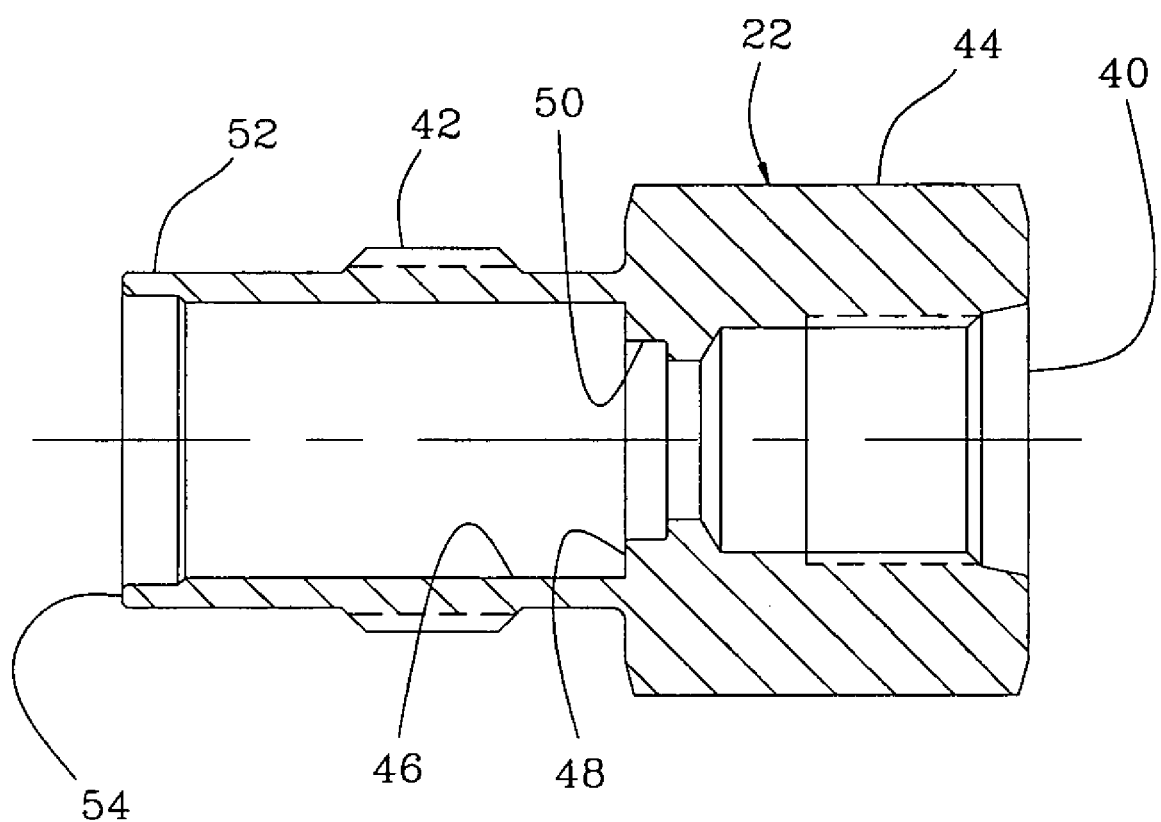
FIG. 7 is a longitudinal cross sectional side view of the valve body of this invention.

Before proceeding with a detailed description of the assembly and function of check valve 20, a detailed description of the above-noted main component parts will now follow. As best shown in FIG. 7, valve body 22, which is preferably fabricated of metal, is generally cylindrical in shape and includes an externally threaded portion 42 for operative engagement with valve cap 24. Body 22 further includes an external tool receiving portion 44, preferably of hexagonal shape, a cylindrical internal bore 46 which serves as a fluid flow passage and as a precise axial guiding bore for axially movable ball guide 28. The inner end of bore 46 is provided a flat annular surface 48 for limiting the axial travel of ball guide 28, which then limits the compression of bias spring 26 and prevent the over-compression thereof. Flat annular surface 48, in turn, merges into a counterbore 50 that functions to retain and center bias spring 26. Outlet port 40 provides for a fluid connection with internal bore 46. The upstream end of valve body 22 includes a cylindrical section 52 having an external diameter closely matched to the internal diameter of cap counterbore 76 (FIG. 8) such that when cap 24. is threadably connected with body 22, the center axes of cap 24 and body 22 are coaxial, which assures the close axial alignment of all internal valve components. A flat end 54 of body 22 functions as a gasket surface which, when cap 24 is threadably engaged onto body 22, forms a compression seal against seat retainer 32 (FIG. 1) to prevent external leakage. Preferably a surface coating (not shown) is applied, if at all, only to valve body internal bore 46 to reduce friction, prevent galling and/or to prevent undesired deposits, and can be beneficial because it will prevent ball guide 28 from getting stuck inside bore 46.

Bias spring 26, as best shown in FIGS. 1 and 2, which is preferably made of metal, is generally cylindrical with parallel ground ends. The diameter of spring 26 is such that it will fit into valve body counterbore 50 and the internal bore 64 (FIG. 9) of ball guide 28 with minimal clearance to align the axes of spring 26 and counterbore 50 while also permitting sufficient clearance for the increase in spring diameter when same is compressed. The diameter of the spring wire and the number of coils will be determined by the preload force required to define the upstream pressure needed to open or crack check valve 20 to allow fluid to flow.

Figure 9:
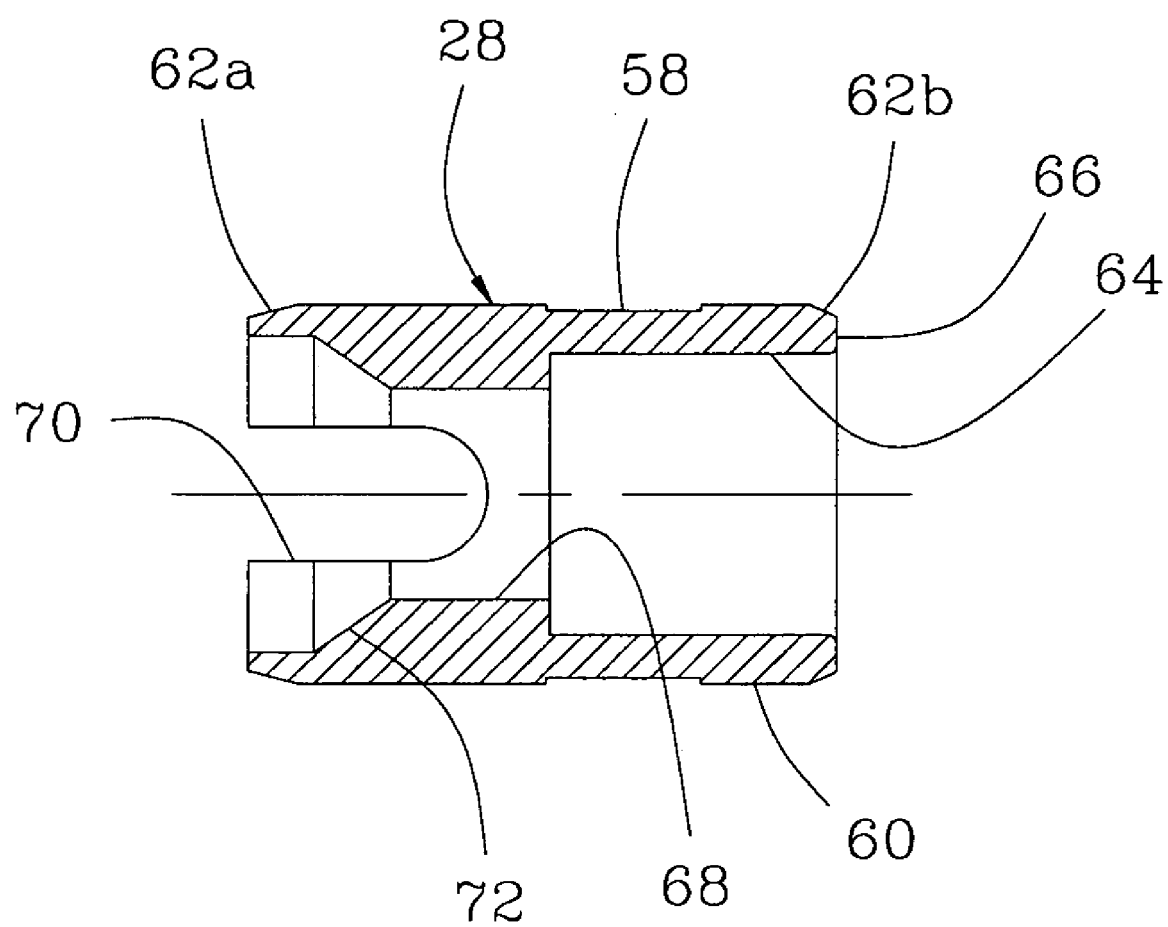
FIG. 9 is a longitudinal cross sectional side view of the ball guide of this invention.

Turning now to FIG. 9, illustrated there is ball guide 28, preferably made of metal, which is generally cylindrical and has a diameter closely matched with that of valve body cylindrical bore 46 for clearance and alignment purposes. A radial relief groove 58 on outside cylindrical surface 60 reduces contact area, minimizes friction and reduces crack pressure variation. Lead-in chamfers 62a, 62b on the outside ends of cylindrical surface 60 serve to prevent ball guide 28 from gouging valve body internal bore 46 during axial movements of the former. The downstream end of ball guide 28 contains an internal bore 64 for housing spring 26 and to provide a fluid flow passage through ball guide 28. A flat annular end surface 66, at chamfer 62b, provides a surface which contacts flat surface 48 of valve body 22 to limit the axial travel of ball guide 28, which then limits the compression of bias spring 26. The upstream end of ball guide 28 contains a cylindrical orifice bore 68 which provides for controlled fluid flow passage, the diameter of which can be sized appropriately for precise fluid flow. A plurality of peripheral metering slots 70 provide a fluid flow passage around sealing ball 30 and by the size, number and length of slots 70 can also control metering flow. A coaxial conical bore 72 provides a pocket for receiving and axially centering sealing ball 30.

Figure 8:
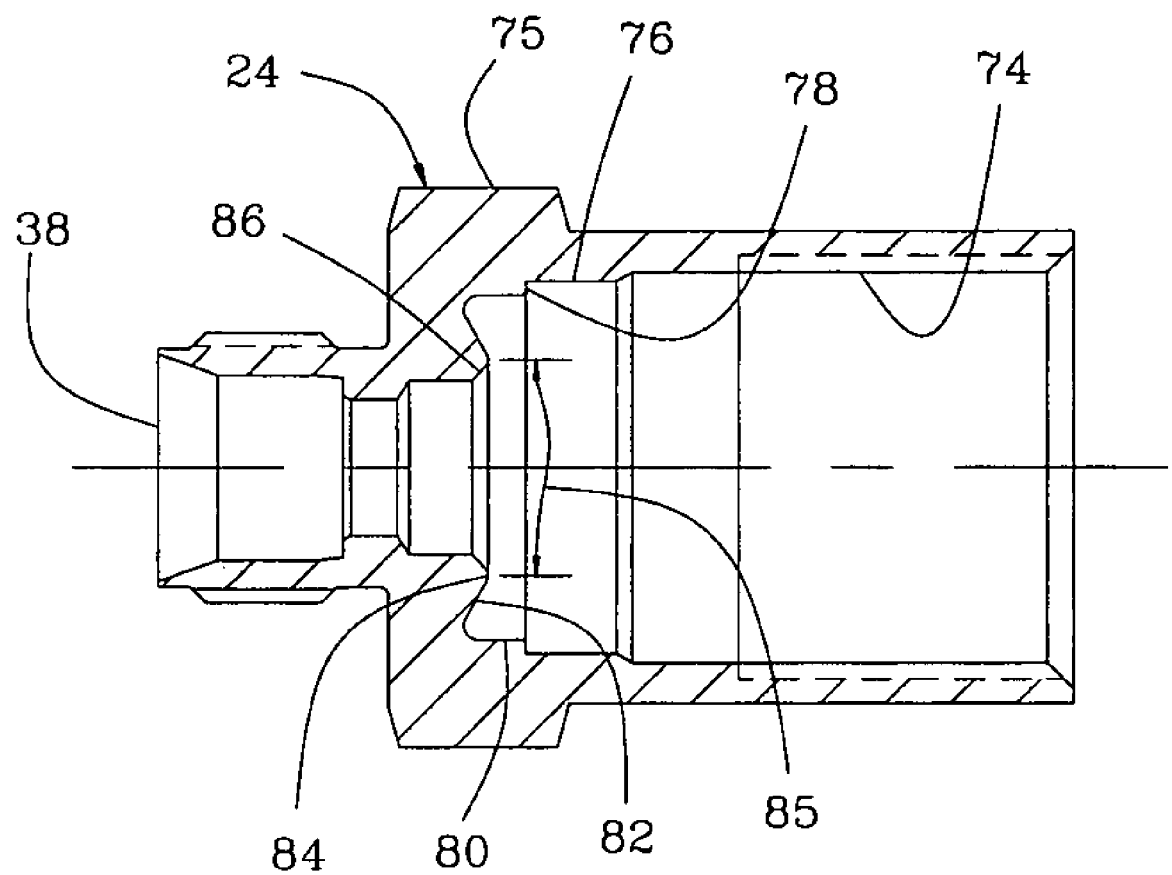
FIG. 8 is a longitudinal cross sectional side view of the valve cap of this invention.
Figure 10:
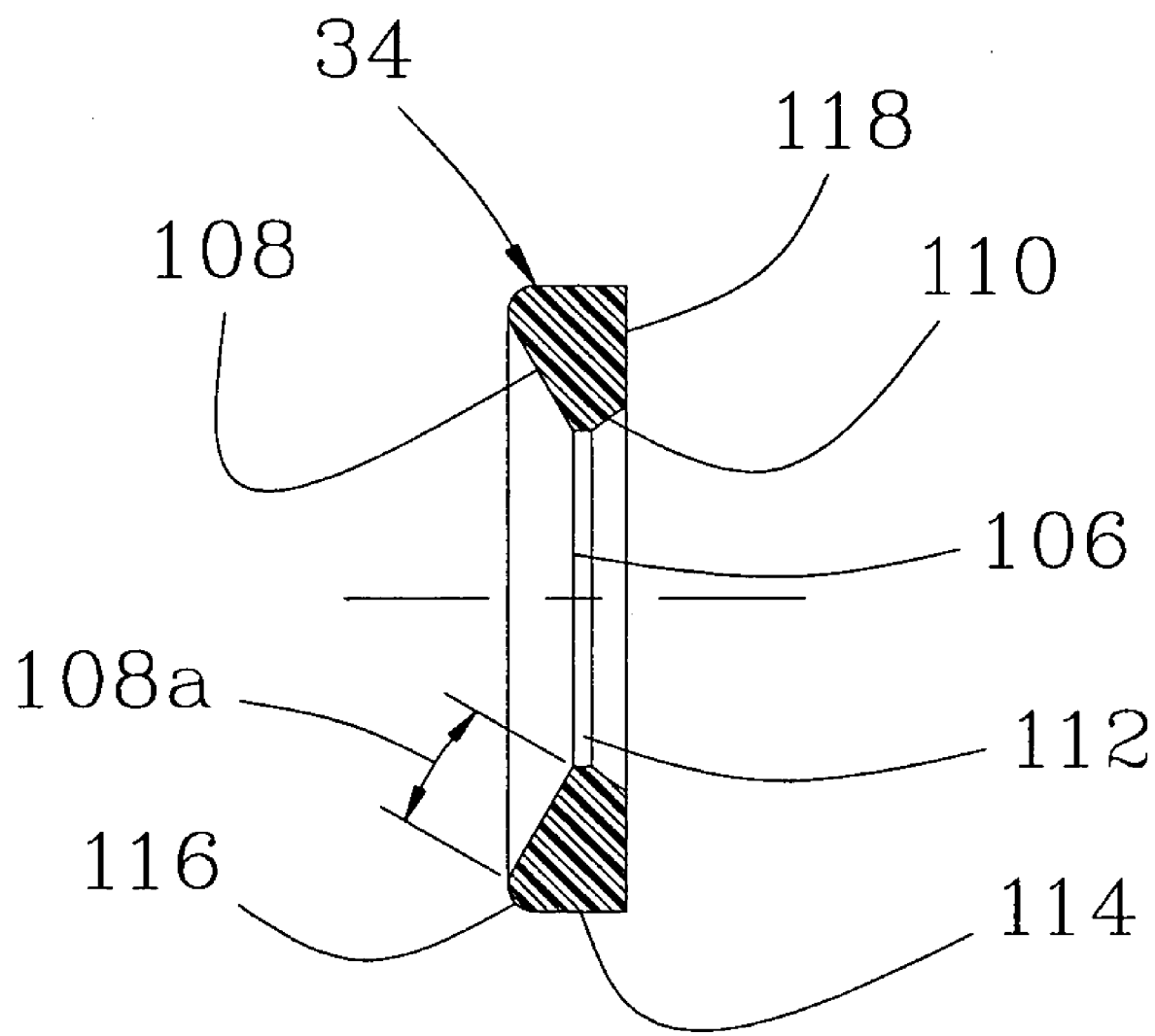
FIG. 10 is a longitudinal cross sectional side view of the thermoplastic seal of this invention.

Continuing now with FIG. 8, illustrated there is valve cap 24, preferably made of metal, which is generally cylindrical in shape, includes inlet port 38, for fluid passage, an internally-threaded portion 74 for threadably engaging valve body 22, and an external tool-receiving portion 75, preferably of hexagonal shape. An internal counterbore 76 has a diameter closely matched to the diameter of valve body cylindrical section 52 such that when cap 24 is threadably engaged into valve body 22, the center axes of valve cap 24 and body 22 are preferably coaxially aligned thus assuring the close axial alignment of all internal components. An annular flat end surface 78 of counterbore 76 acts as a gasket surface which, when valve cap 24 is threadably engaged onto body 22, forms a compression seal against seat retainer 32 (FIGS. 1, 2) to prevent external leakage. As best seen in FIGS. 1 and 2, thermoplastic valve seat 34 is contained within valve cap circular counterbore 80 at the inlet end of valve cap 24. A conical surface 108 (FIG. 10) of the back side of seat 34 matches conical surface 82 of the bottom of valve cap circular counterbore 80, which serves to precisely center valve seat 34 to the central longitudinal axis of valve cap 24. The length of conical surface 82, truncated by radius 84 which, in turn, blends tangentially into a conical bore 86 in valve cap inlet port 38, is by design, shorter than the length or annular extent 108a (FIG. 10) of a conical surface 108 on the back side of seat 34 such that the radial inner portion of conical surface 108 remains unsupported by conical surface 82. A fulcrum line 88 relative to which valve seat 34 flexes, under the load applied by sealing ball 30, is established by diameter 85 of radius 84. The size of diameter 85 will affect the amount of flexure of valve seat 34, with the amount of flexure increasing as diameter 85 increases. Fulcrum line 88 is of importance in the design of seat 34 as it directly impacts the development of the seat stress required for seat flexing. A conical bore 86, in valve cap inlet port 38, is designed to direct and/or control seat material extrusion in front of sealing ball 30 so as to create an additional seal contact area 120d (FIG. 6) of the spherical surface 110 (FIG. 10). The extruded seat material 34a (FIG. 6) is rigidly supported by conical bore 86, which then, in turn, restricts the forward movement of sealing ball 30 and prevents same from pushing completely through seat 34 and contacting the surface of conical bore 86. However, should the operating temperature increase to the point of destroying thermoplastic seat 34, sealing ball 30 will seat against the surface of conical bore 86 and effect a seal, although this seal will permit a certain amount of through leakage.

Figure 11:
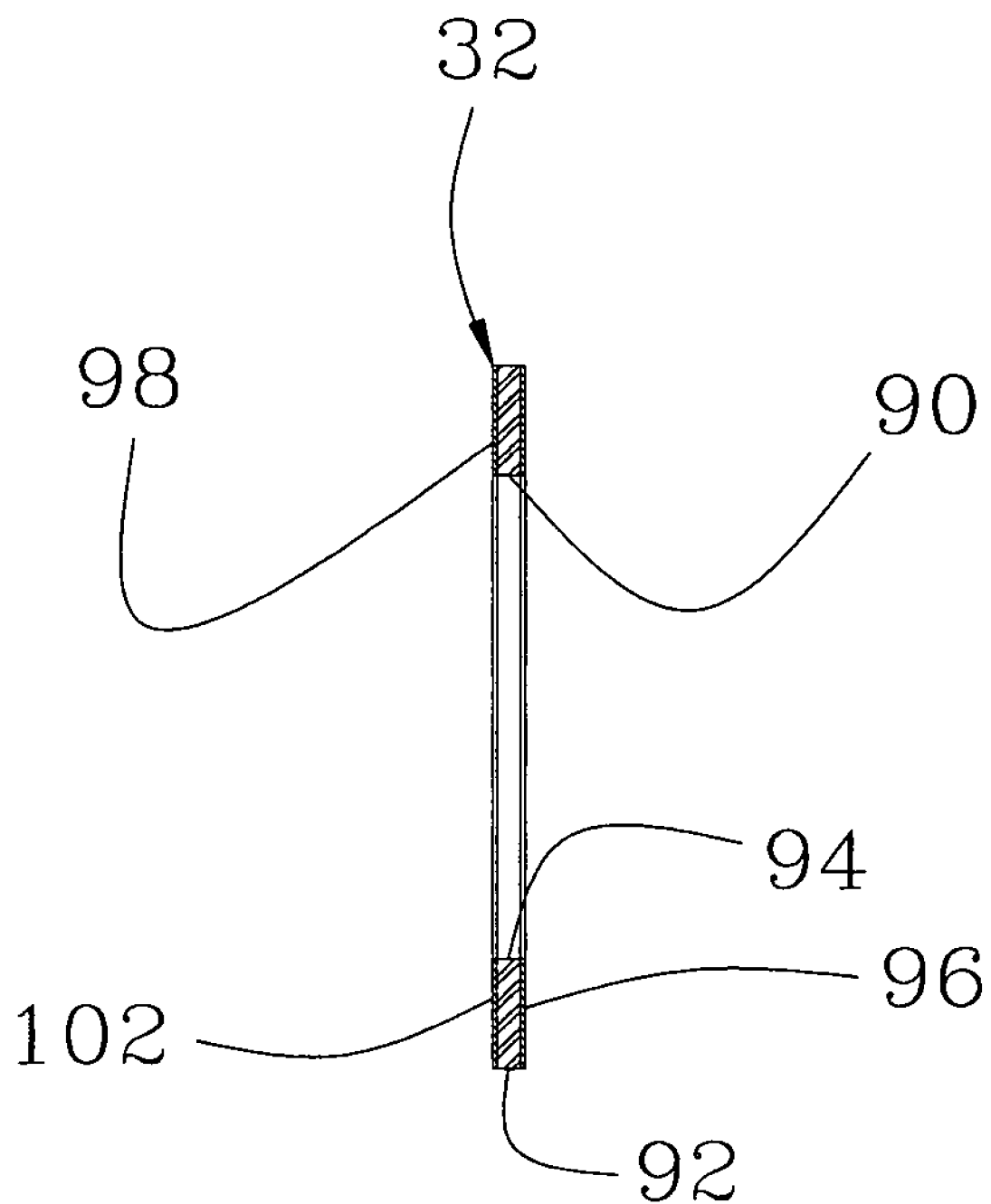
FIG. 11 is a longitudinal cross sectional side view of the seat retainer of this invention.

Focusing now on FIG. 11, illustrated therein is seat retainer 32, preferably constructed of metal and spring-tempered to improve seat clamping force, with retainer 32 being generally round, having a concentric through bore 90, outside diameter 92, inside diameter 94, opposed annular end faces 96, 98, and a substantially rectangular cross section. Seat retainer 32 performs a dual function, first to retain valve seat 34 within valve cap counterbore 80 and secondly, to form an external seal between valve body 22 and cap 24. This external seal is achieved when valve body 22 is threadably engaged into cap 24 with a specified amount of torque. The respective front and rear surfaces 96, 98 of seat retainer 32 are compressed between valve body flat end 54 and valve cap flat shoulder 78, thus effecting a seal. The surfaces of seat retainer 32 may be coated, such as at 102, with a material such as PTFE to improve the integrity and tightness of the external seal, or separate gaskets (not shown), compressed between valve body end 54, seat retainer 32 and valve cap counterbore shoulder 78, may be employed as an alternative. Seat retainer 32 retains valve seat 34 in valve cap counterbore 80 under a spring-like compression force. The thickness or axial extent of seat 34 is slightly greater than the depth or axial extent of cap counterbore 80 so that, when valve body 22 is threadably engaged into cap 24 with a specified amount of torque and seat retainer 32 is compressed between valve body flat end 54 and valve cap flat shoulder 78, an area 100 (best shown in FIG. 1) of seat retainer 32, unsupported by valve body flat end 54, flexes elastically, thereby generating a clamping force against seat 34.

As illustrated in FIG. 2, sealing ball 30, preferably made of metal, has a spherical surface 36.

FIG. 10 illustrates seat 34 as being generally cylindrical, having a concentric through bore 106 and an, adjoining conical counterbore 108 which has an internal angle substantially similar to cap conical bottom surface 82, with the substantial matching of theses conical surfaces assuring the precise axial centering of seat 34 relative to cap 24. Seat 34 further includes spherical seal surface 110, inner peripheral surface 112, outer peripheral surface 114, radius portion 116 and flat annular end face 118. The radius of spherical seal surface 110 is slightly larger, generally in the range of 0.002 to 0.010 inches, than spherical radius 36 of sealing ball 30. The amount of surface area contained in spherical surface 110 can be adjusted, by design, to provide for an optimum level of contact stress for low pressure seal tightness and/or high back pressure load capacity and/or for a particular type of thermoplastic seat material and/or for a specific application requirement while still maintaining the modular design of the valve and utilizing fully interchangeable valve seats. Seat 34 is generally constructed of thermoplastic or fluoroplastic materials, examples of which include PTFE (filled or unfilled and advanced copolymer grades), acetal, ultra high molecular weight polyethylene, polymide (filled or unfilled) and polyetheretherketone (filled or unfilled) materials.

Turning now to a detailed description of the assembly and function of check valve 20, check valve 20 includes sealing ball 30 that is axially movable within valve body cylindrical bore 46. Ball 30 is guided during axial movement by axially movable cylindrical ball guide 28 which also provides for the precise centering of ball 30 relative to the axis of valve body cylindrical bore 46. However, since ball 30 is not physically attached to ball guide 28, ball 30 may still align itself to mating spherical seal surface 110 of valve sear 34 if ball guide 28 should become slightly misaligned relative to bore 46 as a result of the necessary clearance between ball guide 28 and valve body cylindrical bore 46. Ball guide 28 also includes internal bore portion 64 for accepting spring 26 which provides the bias force, for ball guide 28, that is subsequently transferred to ball 30.

Thermoplastic valve seat 34 is contained within valve cap circular counterbore 80 in the vicinity of valve cap inlet port 38. Conical surface 108, on the back side or surface of seat 34, substantially matches conical surface 82 of the bottom of valve cap circular counterbore 80 which precisely centers seat 34 to the center axis of cap 24. Seat 34 is retained within counterbore 80 by circular retaining washer or seat retainer 32 which fits into valve cap counterbore 76. Retaining washer 32 also exerts and maintains a spring clamping force on seat 34 to establish a seal between seat surface 108 and conical bottom surface 82 of cap counterbore 80. Retaining washer 32, having concentric through bore 90, has its inside diameter 94 dimensioned large enough to expose spherical seal surface 110, molded or machined on the front side of seat 34 and with which axially movable ball 30 engages, to form a seal when the bias force, exerted by spring 26 and combined with the force exerted by fluid pressure at valve outlet port 40, exceeds the force exerted by the fluid pressure at valve inlet port 38.

The seal, between ball 30 and seat 34, is achieved by a compressive load applied to seat spherical seal surface 110 by ball spherical surface 36. This compressive load produces a contact surface stress between ball surface 36 and seal surface 110 of a magnitude dependent upon the contact area according to the formula of applied force divided by contact area. Generally, with a compressive type seal, the contact stress must reach a certain minimum level before a seal can be achieved. This magnitude of the minimum required contact stress is affected by the manufacturing precision of the sealing members, seal material properties such as hardness, and the type of fluid or gas to be sealed. Seat spherical seal surface 110 is configured so as to provide a variable portion of this seal area to be in contact with ball 30 in order to maintain the contact stress above the required minimum level to provide for consistent seal tightness at low fluid pressure while also providing for an increased seal contact area in order to reduce seat stress and minimize plastic deformation at higher fluid pressures. These objectives are achieved by machining or molding spherical surface 110 into seat 34 with a radius that is slightly larger, preferably in the range of 0.002 to 0.010 inches, than the radius of ball 30 and by providing partial support to seat back surface 108 such that a bending moment will develop in seat 34 due to the force applied by ball 30, thus causing seat 34 to flex.

Figure 3:
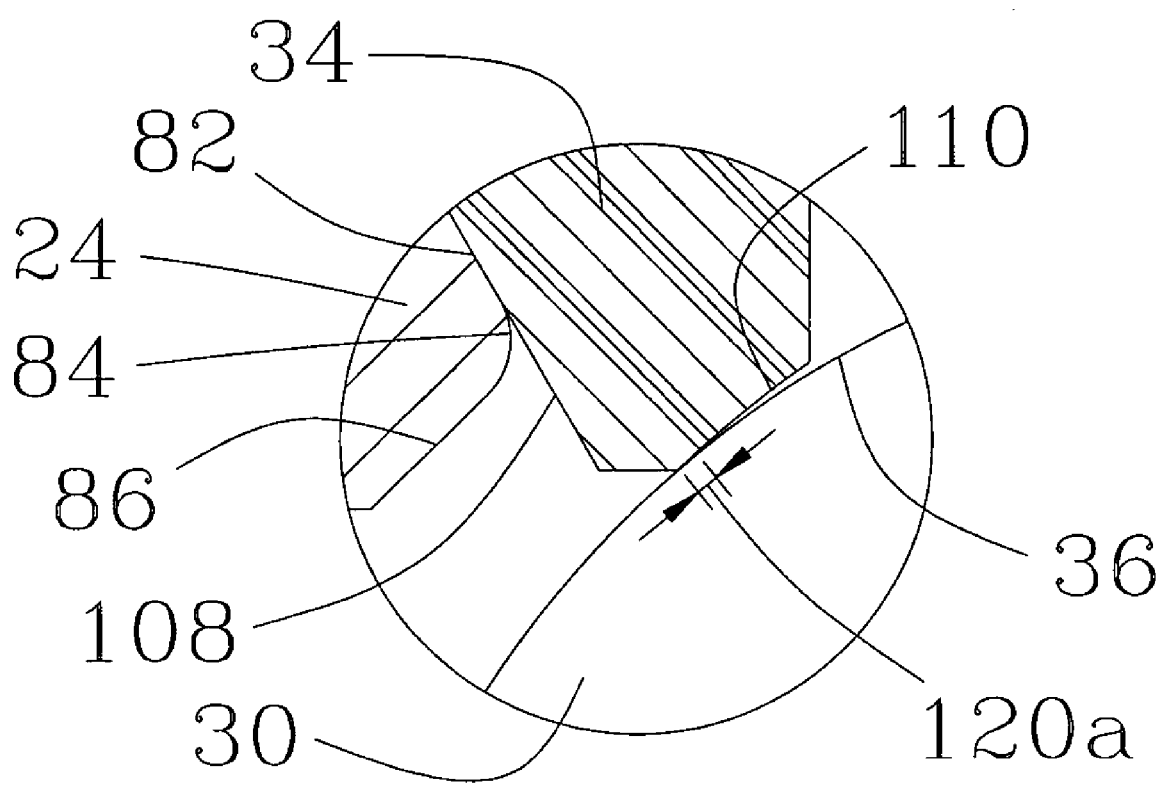
FIG. 3 is an enlarged cross sectional side of the valve seat sealing area, illustrating the principle of the method of sealing at low back pressure and operating temperature.
Figure 4:
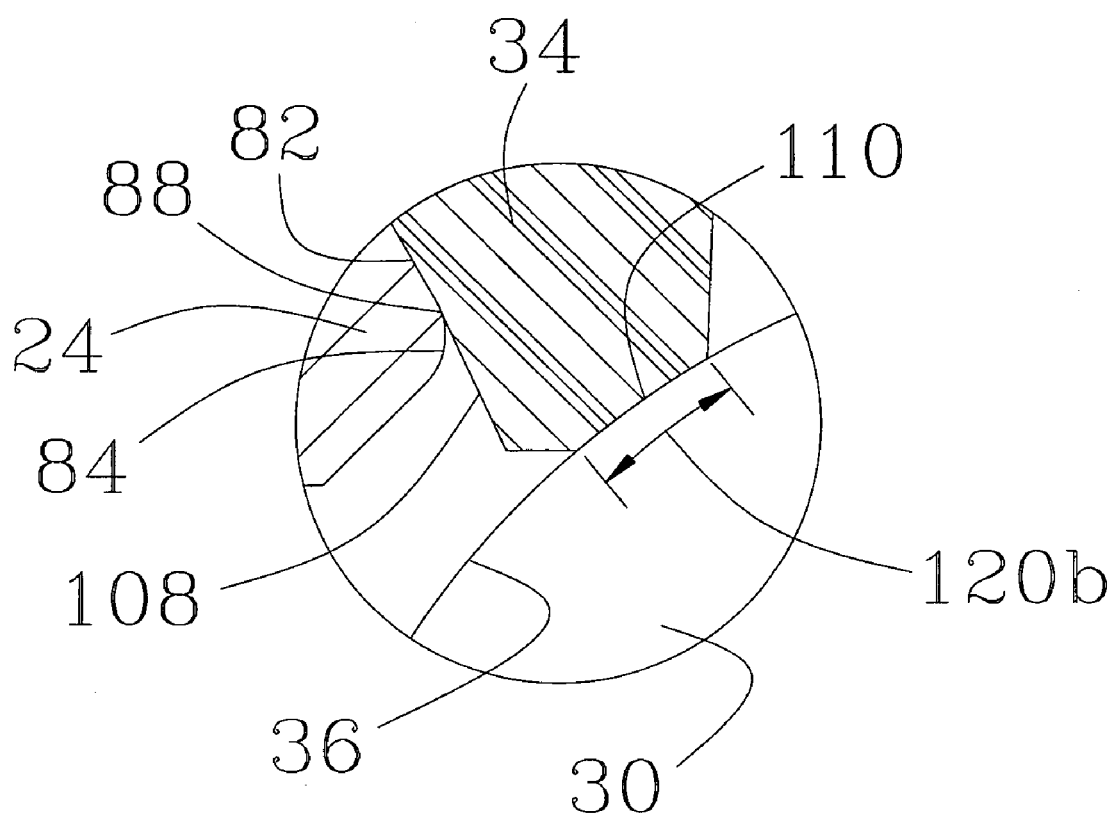
FIG. 4 is a view, similar to that of FIG. 3, illustrating the principle of the method of sealing at moderate back pressure and operating temperature.

Referring now to FIG. 3, at low fluid back pressure, only a small area 120a of seat spherical seal surface 110 is in contact with ball spherical surface 36, resulting in high contact stress which improves low pressure sealing capabilities. As fluid back pressure increases, the force of ball 30 pushing into seal surface 110 increases, thereby developing a bending moment in seat 34. Continuing to FIG. 4, this bending moment results in a flexure in seat 34, which exposes an increased area 120b of seal surface 110 into contact with ball surface 36. This increase in contact area limits the increase in seat stress as the fluid pressure increases, thus preventing significant permanent deformation to thermoplastic seat 34 over an extended range of fluid pressure while still achieving an amount of contact stress above the required minimum to maintain a satisfactory seal.

Figure 5:
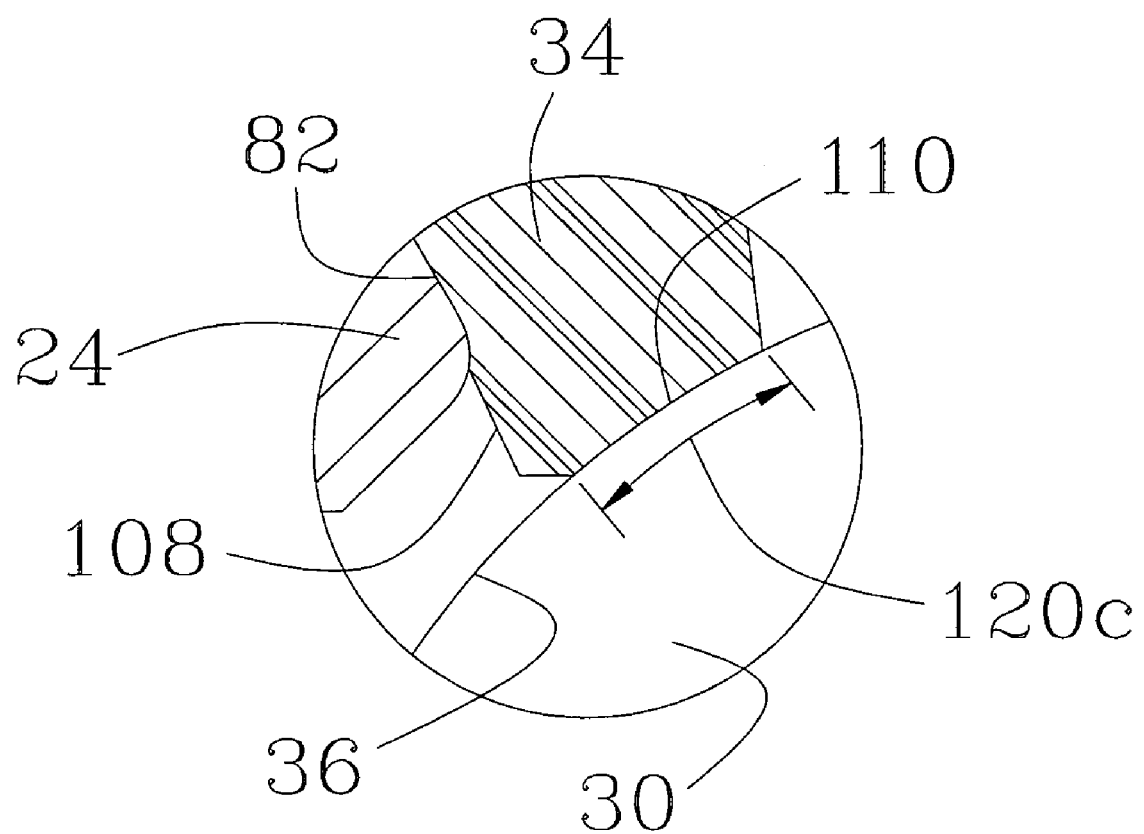
FIG. 5 is a view, also similar to that of FIG. 3, illustrating the principle of the method of sealing at high back pressure and operating temperature.

Seat 34 can also compensate for high fluid back pressures that result in stress that is above the plastic deformation range of the thermoplastic material from which seat 34 is formed. Turning specifically to FIG. 5, as ball 30 pushes deeper onto seal surface 110, the area of seal surface 110 is enlarged by plastic deformation until the stress is redistributed and reduced to a level below that of the plastic deformation range of the thermoplastic seat material. This results in a permanent deformation (via enlargement) of seal surface 110 which in turn provides for an increased seal contact area 120c that can support the higher fluid pressure loading. It should be understood that the plastic deformation of thermoplastic seat 34 will not compromise low pressure seal performance. As seal surface 110 is deformed, the precision of its spherical surface is improved so as to more closely match that of ball surface 36. In addition, any surface irregularities in spherical surface 110 that result from the original formation thereof are reduced, thus producing an improved surface finish that lowers the minimum level of surface contact stress required to achieve a seal. At elevated operating temperatures, the thermoplastic material of seat 34 expands greatly in volume and also softens, which, when under a compressive load, can result in significant plastic deformation, commonly referred to as hot flow. Seat 34 is designed to compensate for this condition in two ways, the first of which is identical to the high fluid pressure compensation, as already previously described, wherein ball 30 is forced deeper into seal surface 110 thus enlarging contact area 120c until the stress is stabilized below the creep range of the seat material.

Figure 6:
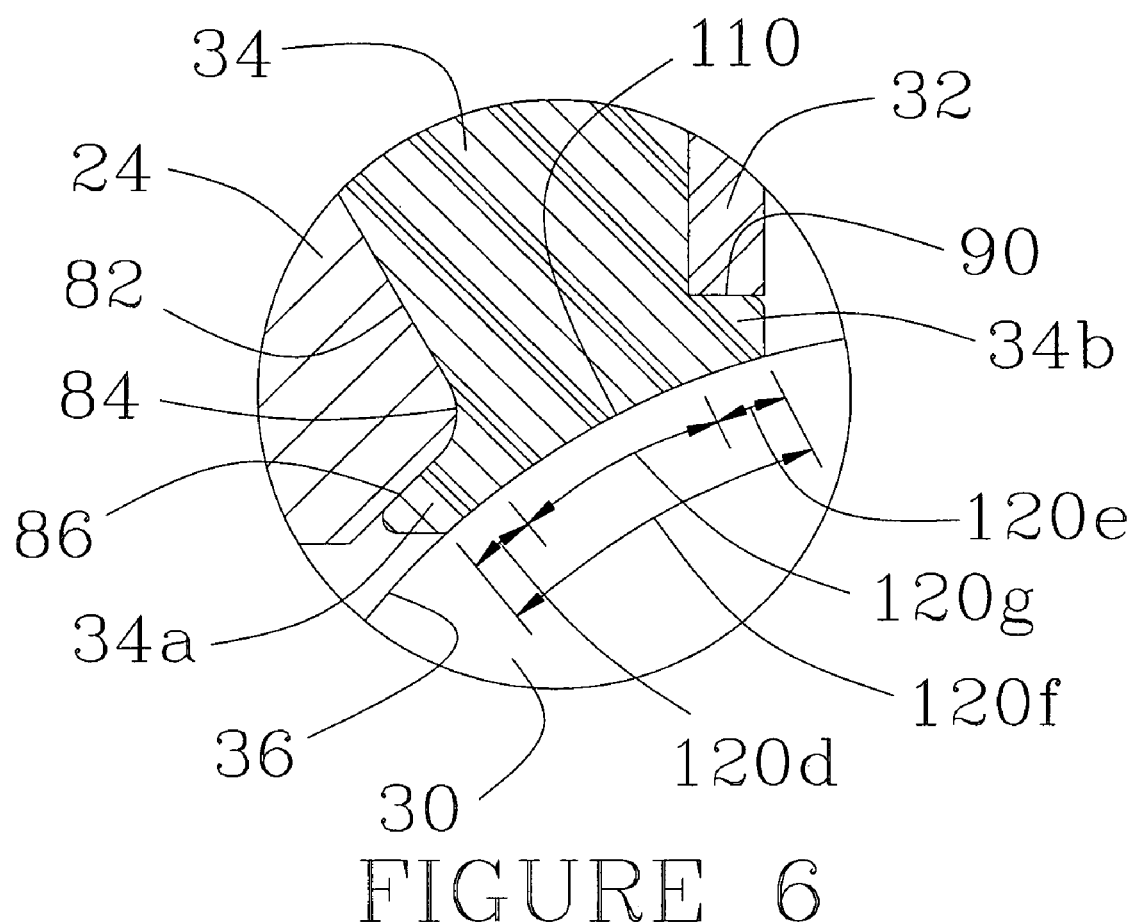
FIG. 6 is a view, again similar to that of FIG. 3, illustrating the principle of the method of seat extrusion at high temperature.

Now referring to FIG. 6, in the second compensating way, as ball 30 is forced deeper into seat 34, the plastic material of seat 34 is extruded outwardly around ball 30 in opposing directions. One portion 34a of the material of seat 34 extrudes in front of ball 30 into conical bore 86 in valve cap inlet port 38, thereby producing an additional seal contact area 120d of spherical seal surface 110. This extruded material is rigidly supported by conical bore 86 in valve cap inlet port 38 which restricts the forward movement of ball 30 and prevents ball 30 from pushing completely through seat 34 and contacting the surface of conical bore 86. Another portion 34b of the seat material extrudes between ball 30 and seat retainer through bore 90, with this extruded material being rigidly supported by the cylindrical wall of bore 90, thereby producing a yet additional seal contact area 120e of spherical seal surface 110. The enlargement of the seal contact area of seal surface 110, resulting from noted seat material extrusions 34a, 34b, continues until the seat stress stabilizes below the creep limit of the thermoplastic seat material.

The desired result of the extrusions 34a, 34b, of the thermoplastic material of seat 34 is the total enlarged seal contact area 120f of spherical seal surface 110, with contact area 120f being the combination of additional contact areas 120d and 120e with original contact area 120g. The acceptable amount of load for seat 34 is limited by the yield strength and resistance to creep (hot flow) of the seat material at a specific operating temperature. Stress being defined as unit load per area, an increase in unit area will permit a related increase in unit load while still maintaining identical stress in the seat material.

Figure 12:
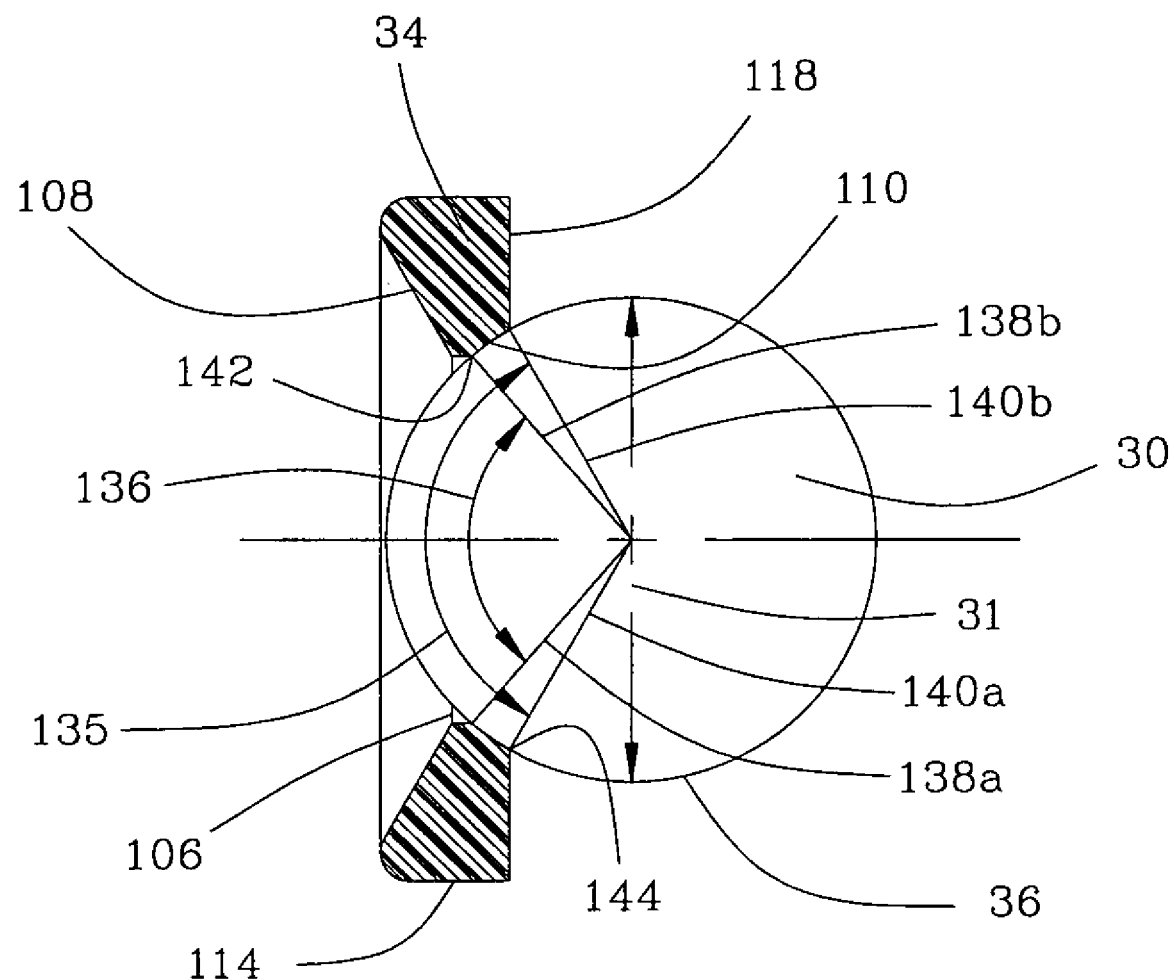
FIG. 12 is a view, similar to that of FIG. 10, with the addition of a mating ball, illustrating the sealing relationship therebetween.

Turning now to FIG. 12, it illustrates seat 34 in combination with sealing ball 30. The relationship between the size of the outside diameter 31 of ball 30 and the spherical sealing surface 110 of seat 34 can be varied or adjusted to affect the sealing performance to best suit the material or material characteristics of seat 34 and the operating pressure and temperature conditions encountered during use. This relationship is best illustrated by the two shown included angles 135 and 136 that are defined by the intersection of ball spherical surface 36 and the spherical sealing surface 110 of seat 34. The smaller or interior angle 136 is defined by two line segments 138a, 138b, drawn from the center point of ball 30 to the intersection points of spherical surface 36 and spherical sealing surface 110 at a point 142 at the end of through bore 106 of seat 34. The larger or exterior angle 135 is defined by two line segments 140a, 140b, drawn from the center point of ball 30 to the intersection points of spherical surface 110 at a point 144 at the radial inner end of flat annular end face 118 of seat 34.

The size or angular extent of interior angle 136 is important and measurably affects both the load capacity and the low pressure seal ability of seat 34. Reducing the extent of interior angle 136, which can be accomplished by reducing the size of concentric through bore 106 of seat 34 relative to the diameter of ball 30, adds surface area to spherical sealing surface 110, thereby increasing the load capacity of seat 34. However, at the same time, the ability of seat 34 to seal at low pressure is reduced correspondingly as the extent of interior angle 136 is reduced.

The reduction of low pressure seal ability, as the extent of interior angle 136 is reduced, is due to a reduction of the mechanical advantage that consequently reduces the magnitude of the force that generates the contact stress necessary to effect a seal in the small area 120a (FIG. 3) of seat spherical seal surface 110. In effect, ball 130 acts as a wedge driven into seat 34 at low pressure, generating an outwardly radial load against small area 120a. Similar to a simple wedge, the magnitude of the outwardly radial force can be many times greater than the end force and is commonly referred to as "mechanical advantage". The mechanical advantage of a simple wedge is a direct function of the wedge angle, with greater advantage being achieved as the extent of the wedge angle is reduced. A similar effect is observed in the present invention, wherein an increase in the extent of interior angle 136 creates an increase in mechanical advantage in a manner similar to decreasing the extent of a simple wedge angle.

Thus, an improved low pressure seal is achieved by increasing the extent of the interior angle 136, which for a given load on ball 30, due to the applied pressure, increases the force applied by ball 30 on small area 120a, which in turn results in increased contact stress between ball 30 and small area 120a, thus extending the lower range of pressure where a minimum contact stress, necessary to effect a seal in small area 120a, can be achieved.

Based on the above discussion, there exist optimal geometries of interior angle 136 and exterior angle 135, irrespective of the actual size of these components, that provide for optimal sealing performance of floating ball check valve 20, dependent upon: the material composition of seat 34; the desired range of sealing pressures; the operating temperature of the application; and the type of fluid to be sealed. Preferably the extent of interior angle 136 ranges or varies between 80 degrees, for higher pressure applications, and 130 degrees for lower pressure applications. The extent of exterior angle 135 preferably ranges or varies between 110 degrees and 160 degrees, and is established so as to provide a sufficient amount of spherical surface area 110 of seat 34 for a particular material composition of seat 34 so as to support the loading of ball 30 at the maximum pressure and temperature of the specific application.

Thus, as previously described, the present invention provides a ball check valve with a thermoplastic seat that has the unique ability to self-adjust its seal surface area and geometry to provide for optimum seal performance, for the specific operating temperature and pressure of a particular application, within an expanded overall allowable range of fluid pressures and temperatures for a specific type of thermoplastic seat material.

It is deemed that one of ordinary skill in the art will readily recognize that the present invention fills remaining needs in this art and will be able to affect various changes, substitutions of equivalents and various other aspects of the invention as described herein. While the present invention has been described with reference to but one type of a floating ball check valve, this invention is deemed to be readily applicable to all types of such valves. Thus, it is deemed that the protection granted hereon be limited only by the scope of the appended claims and their equivalents.

What is claimed is:

1. A floating ball check valve, comprising in combination:
   a. a body having inner and outer axially adjacent portions, with each non-adjacent end thereof including a coupling member, said body including a through bore, with said body inner portion having first and second concentric cylindrical bores and an outlet port;
   b. a cap having inner and outer axially adjacent cap portions, with each non-adjacent end thereof including a coupling member, said cap including a through bore, with said cap inner portion having a plurality of concentric cylindrical bores, said cap outer portion having an inlet port and a concentric conical surface, said body inner portion being adapted to be inserted into a first one of said plurality of cylindrical bores of said cap inner portion and coupled with said cap inner portion;
   c. a generally cylindrical ball guide having a through bore and axially spaced internal bore portions, said ball guide being adapted to be slidably inserted into said first bore of said body inner portion, said ball guide also including a ball pocket portion for receiving and axially centering a sealing ball;
   d. a biasing spring adapted to be inserted into said body through bore and confined between said body inner portion second bore and an opposing internal bore portion of said ball guide, said spring serving to bias said sealing ball in the direction of said inlet port;
   e. a generally annular seat retainer located adjacent to said conical bore of said cap outer portion, with a radial outer annular portion of said seat retainer being biased against a radial outer shoulder portion of said conical bore portion by an end surface of said body inner portion; and
   f. a generally ring shaped seat, of non-resilient plastic material, substantially received within said conical surface of said cap outer portion and retained therein via a radial inner annular portion of said seat retainer, with the spherical surface of said sealing ball being urged into a sharp corner line contact sealing engagement with an adjoining seal surface of said seat, wherein said adjoining seal surface takes the form of a curved seal surface having sufficient seal surface contact with said sealing ball to prevent excessive yielding of said non-resilient plastic seat material at predetermined operating temperatures and back pressures.

2. The ball check valve of claim 1, wherein said curved seal surface takes the form of a spherical surface.

3. The ball check valve of claim 2, wherein said spherical seal surface has a radius slightly larger than the spherical radius of said sealing ball.

4. The ball check valve of claim 3, wherein said spherical seat surface radius is slightly larger, in the range of about 0.002 to 0.010 inches, than the spherical radius of said sealing ball.

5. The ball check valve of claim 2, wherein the spherical radius of said sealing ball is slightly smaller than the radius of said spherical seal surface.

6. The ball check valve of claim 5, wherein the spherical radius of said sealing ball is slightly smaller, in the range of about 0.002 to 0.010 inches, than the radius of said spherical seal surface.

7. The ball check valve of claim 2, wherein said ring-shaped seat further includes a concentric through bore and a flat annular end surface, said seal spherical surface being bounded, on one end, by a radial inner end of said annular end face and, on another end, by one end of said concentric through bore.

8. The ball check valve of claim 7, wherein a first intersection of said sealing ball spherical surface with said seal spherical surface is bounded by said radial inner end of said seat annular end face and a second such intersection of said sealing ball spherical surface with said one end of said seal spherical surface is bounded by said one end of said seat concentric through bore.

9. The ball check valve of claim 8, wherein said first intersection of said sealing ball spherical surface with said annular end face radial inner end, when viewed in cross section, is defined by a first angle bounded by two line segments extending from the center of said sealing ball to said first intersection.

10. The ball check valve of claim 9, wherein said second intersection of said sealing ball spherical surface with said one end of said seat concentric through bore, when viewed in cross section, is defined by a second angle bounded by two additional line segments extending from the center of said sealing ball to said second intersection.

11. The ball check valve of claim 10, wherein said first angle is of a greater angular extent than said second angle.

12. The ball check valve of claim 9, wherein the angular extent of said first angle ranges from about 110 to about 160 degrees.

13. The ball check valve of claim 10, wherein the angular extent of said second angle ranges from about 80 to about 130 degrees.

14. The ball check valve of claim 1, wherein said non-resilient plastic material is a fluoroplastic type of material.

15. The ball check valve of claim 1, wherein said non-resilient plastic material is one of a thermoplastic and fluoroplastic material.

16. The ball check valve of claim 15, wherein said thermoplastic and fluoroplastic materials are selected from the group consisting of PTFE of filled, unfilled and advanced copolymer grades thereof.

17. The ball check valve of claim 1, wherein said non-resilient plastic materials are selected from the group consisting of acetal, ultra high molecular weight polyethylene, filled and unfilled polymide as well as filled and unfilled polyetheretherketone materials.

18. In a method of manufacturing a ball check valve, comprising:
   a. providing a body having inner and outer axially adjacent portions, with each non-adjacent end thereof including a coupling member, said body including a through bore, with said body inner portion having first and second concentric cylindrical bores and an outlet port; a cap having inner and outer axially adjacent cap portions, with each non-adjacent end thereof including a coupling member, said cap including a through bore, with said cap inner portion having a plurality of concentric cylindrical bores, said cap outer portion having an inlet port and concentric conical surface; a generally cylindrical ball guide having a through bore and axially spaced internal bore portions, said ball guide also including a ball pocket portion for receiving and axially centering a sealing ball;
   b. inserting said body inner portion into a first one of said plurality of cylindrical bores of said cap inner portion and coupling same together;
   c. slidably inserting said ball guide into said first bore of said body inner portion member inner portion;
   d. inserting a biasing spring into said body through bore and confining same between said body inner portion second bore and an opposing internal bore portion of said ball guide, said spring serving to bias said sealing ball in the direction of said inlet port;
   e. locating a generally annular seat retainer adjacent said conical surface of said cap outer potion and biasing, via an end surface of said body inner portion, a radial outer annular portion of said seat retainer against a radial outer shoulder portion of said conical bore portion; and
   f. locating a generally ring-shaped seat, of non-resilient plastic material, substantially within said conical surface of said cap outer portion and retaining same therein via a radial inner annular portion of said seat retainer and urging the spherical surface of said sealing ball into a sharp corner line contact sealing engagement with an adjoining conical seal surface of said seal, the improvement comprising:
   g. modifying said adjoining conical seal surface to the form of a curved seal surface having sufficient seal surface contact with said sealing ball to prevent excessive yielding of said non-resilient plastic material at predetermined operating temperatures and back pressures.

19. In the improved method of manufacturing the ball check valve of claim 18, further modifying said adjoining conical seal surface to the form of a spherical seat surface.

20. In the improved method of manufacturing the ball check valve of claim 19, additionally modifying said adjoining conical seal surface to have a radius slightly larger than the spherical radius of said sealing ball.

21. In the improved method of manufacturing the ball check valve of claim 20, increasing said spherical seal surface radius to be slightly larger, in the range of about 0.002 to about 0.010 inches, than the spherical radius of said sealing ball.

22. In the improved method of manufacturing the ball check valve of claim 18, further including: selecting said non-resilient plastic material from the group consisting of thermoplastic and fluoroplastic materials.

* * * * *